United States Patent
Vishwakarma et al.

(10) Patent No.: US 11,599,402 B2
(45) Date of Patent: Mar. 7, 2023

(54) METHOD AND SYSTEM FOR RELIABLY FORECASTING STORAGE DISK FAILURE

(71) Applicant: EMC IP Holding Company LLC, Hopkinton, MA (US)

(72) Inventors: Rahul Deo Vishwakarma, Bangalore (IN); Jayanth Kumar Reddy Perneti, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 588 days.

(21) Appl. No.: 16/529,499

(22) Filed: Aug. 1, 2019

(65) Prior Publication Data
US 2021/0034450 A1    Feb. 4, 2021

(51) Int. Cl.
| | |
|---|---|
| *G06F 3/06* | (2006.01) |
| *G06F 11/07* | (2006.01) |
| *G06F 11/00* | (2006.01) |
| *G06F 11/30* | (2006.01) |
| *G06N 20/00* | (2019.01) |

(52) U.S. Cl.
CPC ........ *G06F 11/0727* (2013.01); *G06F 3/0616* (2013.01); *G06F 3/0653* (2013.01); *G06F 3/0689* (2013.01); *G06F 11/008* (2013.01); *G06F 11/3034* (2013.01); *G06N 20/00* (2019.01)

(58) Field of Classification Search
CPC .. G06F 11/0727; G06F 3/0616; G06F 3/0653; G06F 3/0689; G06F 11/008; G06F 11/3034; G06N 20/00; G06N 5/003; G06N 20/20

USPC .......................................................... 714/1
See application file for complete search history.

(56) References Cited

U.S. PATENT DOCUMENTS

| | | | | |
|---|---|---|---|---|
| 6,862,691 B2 * | 3/2005 | Hayden | ...................... | H04L 1/22 714/1 |
| 6,931,519 B1 * | 8/2005 | Keller | ................. | G06F 11/1417 713/1 |
| 7,941,628 B2 * | 5/2011 | Kalos | .................... | G06F 3/0689 711/170 |
| 8,589,196 B2 * | 11/2013 | Grace | .................... | G06Q 40/02 705/7.11 |

(Continued)

FOREIGN PATENT DOCUMENTS

WO    WO-2020000404 A1 *    1/2020    ............ G06F 11/004

OTHER PUBLICATIONS

Ao Ma, Rachel Traylor, Fred Douglis, Mark Chamness, Guanlin Lu, Darren Sawyer, Surendar Chandra, and Windsor Hsu. 2015. RAIDShield: Characterizing, Monitoring, and Proactively Protecting Against Disk Failures. ACM Trans. Storage 11, 4, Article 17 (Nov. 2015), (17 pages).

(Continued)

*Primary Examiner* — Albert Decady
*Assistant Examiner* — Enam Ahmed
(74) *Attorney, Agent, or Firm* — Chamberlain, Hrdlicka, White, Williams & Aughtry

(57) ABSTRACT

A method and system for reliably forecasting storage disk failure. Specifically, the method and system disclosed herein entail predicting whether one or more storage disks may fail within a future time period. Further, the storage disk failure forecasts may rely on machine learning classification coupled with prediction reliability scoring.

16 Claims, 4 Drawing Sheets

(56) References Cited

U.S. PATENT DOCUMENTS

| | | | | |
|---|---|---|---|---|
| 8,806,272 B2* | 8/2014 | Yokote | G06F 11/008 714/1 |
| 2004/0123179 A1* | 6/2004 | Dragomir-Daescu | G06Q 10/04 714/1 |
| 2004/0153689 A1* | 8/2004 | Assaf | G06F 11/0787 714/E11.204 |
| 2010/0125746 A1* | 5/2010 | Herrmann | G05B 19/4184 714/E11.029 |
| 2010/0241891 A1* | 9/2010 | Beasley | G06F 11/008 714/E11.178 |
| 2014/0215255 A1* | 7/2014 | Zaheer | G06Q 30/00 714/1 |
| 2015/0379430 A1* | 12/2015 | Dirac | G06N 20/00 706/12 |
| 2019/0295114 A1* | 9/2019 | Pavletic | G06N 3/0454 |
| 2019/0377625 A1* | 12/2019 | Chintalapati | G06N 7/005 |
| 2020/0104200 A1* | 4/2020 | Kocberber | G06F 17/18 |
| 2021/0034450 A1* | 2/2021 | Vishwakarma | G06N 20/00 |

OTHER PUBLICATIONS

Farzaneh Mahdisoltani, University of Toronto; Ioan Stefanovici, Microsoft Research; Bianca Schroeder, University of Toronto. 2017. Proactive error prediction to improve storage system reliability. 2017 USENIX Annual Technical Conference (USENIX ATC '17) (13 pages).

Shiri Gaber, Oshry Ben-Harush, and Amihai Savir. 2017. "Predicting HDD failures from compound SMART attributes", In Proceedings of the 10th ACM International Systems and Storage Conference (SYSTOR '17). ACM, New York, NY, USA, Article 31, (1 page).

* cited by examiner

METHOD AND SYSTEM FOR RELIABLY FORECASTING STORAGE DISK FAILURE

BACKGROUND

Disk drive failure detection is a generic problem across the information technology (IT) space. Despite major efforts, both in industry and in academia, highly reliable solutions directed to disk failure forecasting remain challenging.

SUMMARY

In general, in one aspect, the invention relates to a method for forecasting storage disk failure. The method includes obtaining a select-gapless dataset, initializing a classification learning model, applying incremental learning to the classification learning model using the select-gapless dataset to obtain a set of disk failure forecasts for a set of storage disks, and performing a proactive response based on the set of disk failure forecasts.

In general, in one aspect, the invention relates to a system. The system includes a disk failure forecasting service comprising a computer processor configured to obtain a select-gapless dataset, initialize a classification learning model, apply incremental learning to the classification learning model using the select-gapless dataset to obtain a set of disk failure forecasts for a set of storage disks, and perform a proactive response based on the set of disk failure forecasts.

In general, in one aspect, the invention relates to a non-transitory computer readable medium (CRM). The non-transitory CRM includes computer readable program code, which when executed by a computer processor, enables the computer processor to obtain a select-gapless dataset, initialize a classification learning model, apply incremental learning to the classification learning model using the select-gapless dataset to obtain a set of disk failure forecasts for a set of storage disks, and perform a proactive response based on the set of disk failure forecasts.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment that may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for reliably forecasting storage disk failure. Specifically, one or more embodiments of the invention entails predicting whether one or more storage disks may fail within a future time period. Further, the storage disk failure forecasts may rely on machine learning classification coupled with prediction reliability scoring.

Figure 1:
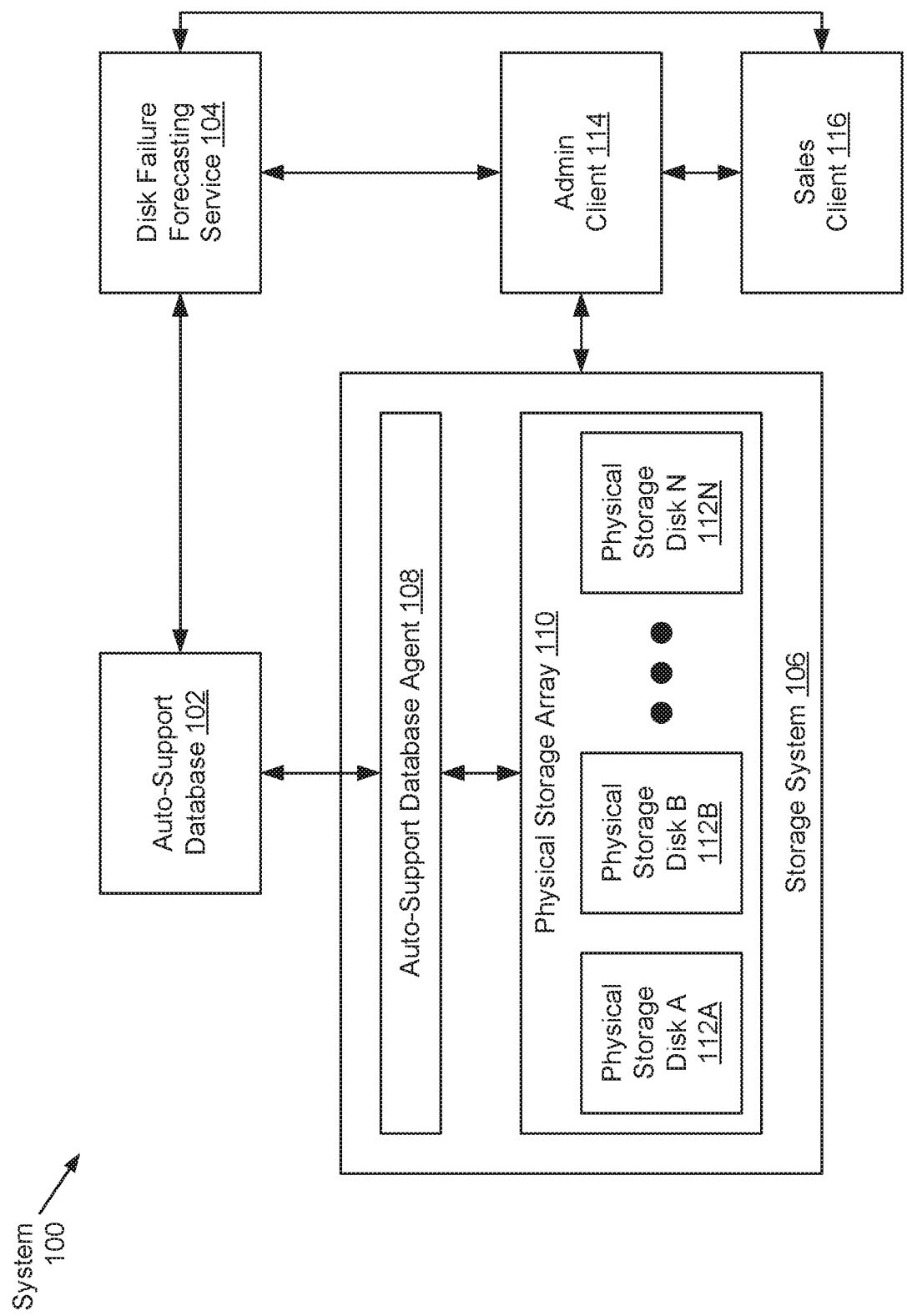
FIG. 1 shows a system in accordance with one or more embodiments of the invention.

FIG. 1 shows a system in accordance with one or more embodiments of the invention. The system (100) may include an auto-support database (102) operatively connected to a disk failure forecasting service (104) and a storage system (106). The system (100) may further include an admin client (114), which may operatively connect to the disk failure forecasting service (104) and the storage system (106), as well as a sales client (116), which may operatively connect to the admin client (114) and the disk failure forecasting service (104). Each of these system (100) components is described below.

In one embodiment of the invention, the above-mentioned system (100) components may operatively connect to one another through a network (not shown) (e.g., a local area network (LAN), a wide array network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the auto-support database (102) may represent a repository for storing configuration, log, and performance information pertaining to the storage system (106). At least a portion of the aforementioned information may take form as: (i) self-monitoring, analysis and reporting technology (SMART) data encompassing various indicators pertinent to storage disk reliability; as well as (ii) small computer system interface (SCSI) error codes indicative of storage disk normalcy or failure. These stored SMART data and SCSI error codes may be gathered and deposited in the auto-support database (102) periodically, and may collectively reflect the operating state of each physical storage disk (112A-112N) (described below) on the storage system (106) at any given point in time.

In one embodiment of the invention, the auto-support database (102) may be implemented using non-transitory computer readable storage media (not shown) on which at least the aforementioned information may be stored in whole or in part, and temporarily or permanently. Further, at least a portion of the auto-support database (102) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the disk failure forecasting service (104) may represent one or more physical devices, a collection of computer programs, or a combination thereof, which may be designed and configured to reliably forecast storage disk failure. To that extent, the disk failure forecasting service (104) may include functionality to perform any subset or all of the flowchart steps outlined in FIGS. 2 and 3. Examples of the physical device(s), which may, at least in part, form the disk failure forecasting service (104) may include, but are not limited to, one or more desktop computers, one or more laptop computers, one or more servers, one or more mainframes, and/or one or more other computing systems similar to the exemplary computing system shown in FIG. 4.

In one embodiment of the invention, the storage system (106) may represent technology including computer hardware, software, and storage media directed to retaining analog and/or digital data. The storage system (106) may be implemented using one or more servers (not shown). Each server may be a physical server, which may reside in a datacenter, or a virtual server, which may reside in a cloud computing environment. Additionally or alternatively, the storage system (106) may be implemented using one or more computing systems similar to the exemplary computing system shown in FIG. 4. Furthermore, the storage system (106) may include an auto-support database agent (108) and a physical storage array (110). Each of these storage system (106) subcomponents is described below.

In one embodiment of the invention, the auto-support database agent (108) may refer to one or more computer programs that may execute on the underlying hardware of the storage system (106). Specifically, the auto-support database agent (108) may be designed and configured for data collection and delivery. To that extent, the auto-support database agent (108) may include functionality to periodically (or on-demand) obtain measurements, metrics, or observations from one or more physical or logical sensors integrated throughout the storage system (106); and, subsequently, transmit these obtained measurements, metrics, or observations to the auto-database (102) over a network (not shown). These measurements, metrics, or observations may collectively encompass the above-mentioned configuration, log, and performance information pertaining to the storage system (106). One of ordinary skill will appreciate that the auto-support database agent (108) may perform other functionalities without departing from the scope of the invention.

In one embodiment of the invention, the physical storage array (110) may refer to a collection of one or more physical storage devices (112A-112N) on which various forms of data may be consolidated. Each physical storage device (112A-112N) may encompass non-transitory computer readable storage media on which data may be stored in whole or in part, and temporarily or permanently. Further, each physical storage device (112A-112N) may be designed and configured based on a common or different storage device technology—examples of which may include, but are not limited to, flash based storage devices, fibre channel (FC) based storage devices, serial-attached small computer system interface (SCSI) (SAS) based storage devices, and serial advanced technology attachment (SATA) storage devices. Moreover, in one embodiment of the invention, any subset or all physical storage device(s) (112A-112N) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the admin client (114) may represent any physical appliance or computing system operated by one or more administrators of the storage system (106). An administrator of the storage system (106) may refer to an individual or entity whom may be responsible for overseeing storage system (106) operations and maintenance. To the extent of interacting with the storage system (106), the admin client (114) may include functionality to receive disk failure forecasts therefrom. These disk failure forecasts may inform the administrator(s) of which physical storage disks (112A-112N) are more likely to fail within a future specified length of time. One of ordinary skill will appreciate that the admin client (1124) may perform other functionalities without departing from the scope of the invention. Examples of the admin client (114) may include, but are not limited to, a desktop computer, a laptop computer, a tablet computer, a server, a smartphone, or any other computing system similar to the exemplary computing system shown in FIG. 4.

In one embodiment of the invention, the sales client (116) may represent any physical appliance or computing system that may operate as a point-of-sale system for the procurement of products (i.e., physical or virtual components) and/or services directed to the maintenance and/or upgrade of the storage system (106). To the extent of interacting with the disk failure forecasting service (104) or the admin client (114), the sales client (116) may include functionality to receive procurement orders therefrom. A procurement order may represent an electronic request for the acquisition (e.g., purchase, delivery, and installation) of, for example, one or more physical storage devices (112A-112N) (described above), which may be used to replace one or more physical storage devices (112A-112N) forecast to fail by the disk failure forecasting service (104). One of ordinary skill will appreciate that the sales client (116) may perform other functionalities without departing from the scope of the invention. Examples of the sales client (116) may include, but are not limited to, a desktop computer, a laptop computer, a tablet computer, a server, or any other computing system similar to the exemplary computing system shown in FIG. 4.

While FIG. 1 shows a configuration of components, other system configurations may be used without departing from the scope of the invention. For example, the system (100) may further include one or more additional storage systems (not shown), which may operatively connect to the auto-support database (102) and the admin client (114). Accordingly, the auto-support database (102) may further store configuration, log, and performance information (described above) pertaining to the/these additional storage system(s).

Figure 2:
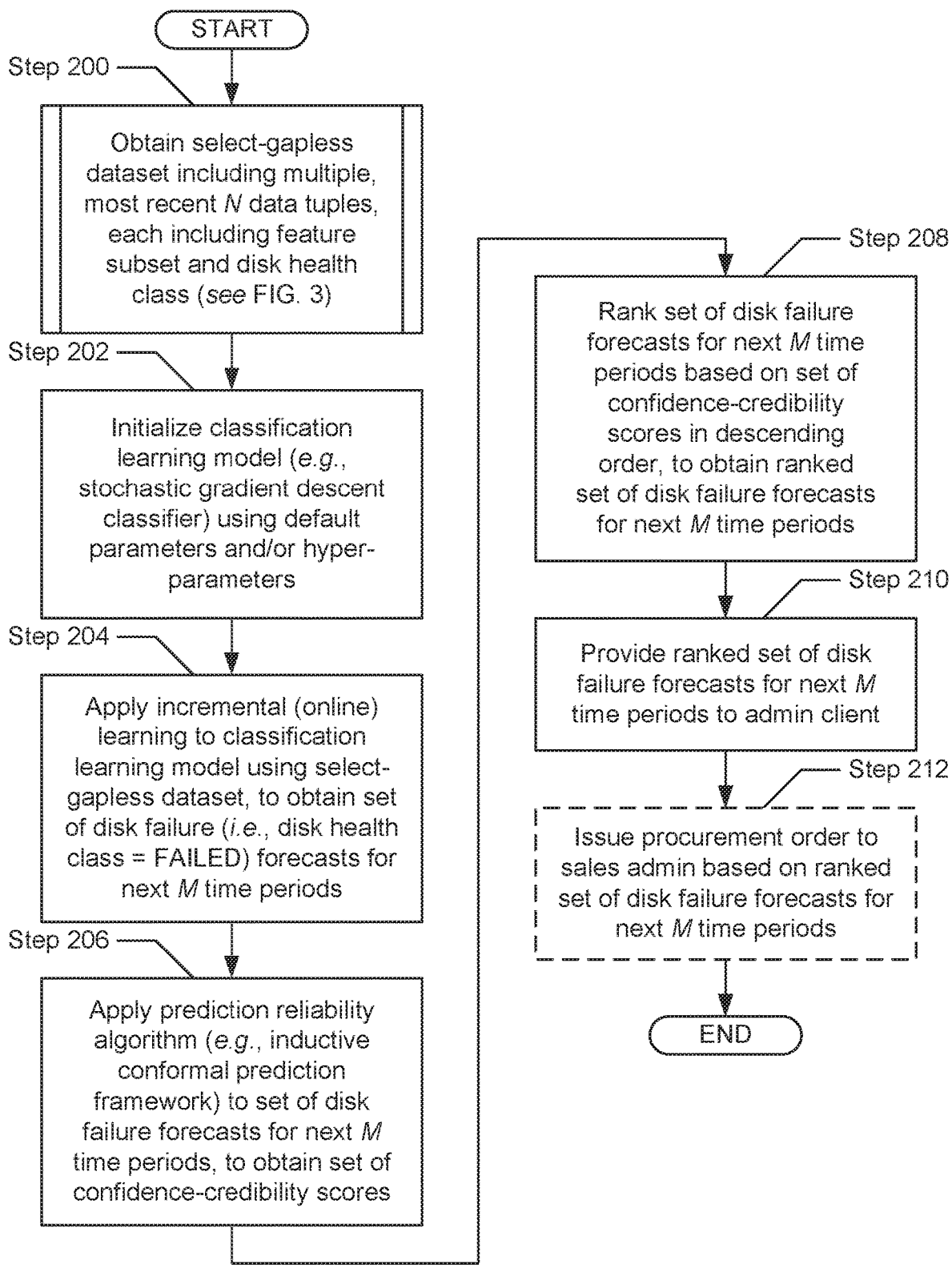
FIG. 2 shows a flowchart describing a method for reliably forecasting storage disk failure in accordance with one or more embodiments of the invention.

FIG. 2 shows a flowchart describing a method for reliably forecasting storage disk failure in accordance with one or more embodiments of the invention. The various steps outlined below may be performed by the disk failure forecasting service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a select-gapless dataset is obtained. In one embodiment of the invention, the select-gapless dataset may include multiple data tuples—each of which map a feature subset to a disk health class. The feature subset may refer to a collection of values representative of a reduced set of the features (or attributes) captured in SMART data (described above—see e.g., FIG. 1) for a given physical storage disk at a given point in time, whereas the disk health class, derived from the SCSI error codes, may refer to a value reflective of the operating state (e.g., normal or failed) of the given physical storage disk at the given point in time. Acquisition of the select-gapless dataset is described in further detail below with respect to FIG. 3.

In Step 202, a classification learning model is initialized. In one embodiment of the invention, the classification learning model may refer to a machine learning schema used in the approximation of a mapping function from a set of input variables (e.g., the feature subset portion of a given data tuple in the select-gapless dataset (obtained in Step 200)) to one or more discrete output variables (e.g., the disk health class portion of the given data tuple). Further, the classification learning model may be based on one of numerous, known machine learning schemas directed to data classification. By way of an example, the classification learning model may be implemented using a stochastic gradient descent (SGD) classifier blueprint. A SGD classifier may refer to any machine learning algorithm or model (e.g., neural networks, support vector machines, decision trees, etc.) that uses SGD as the optimization method for minimizing or maximizing a loss (or error) function. Moreover, implementation of the classification learning model is not limited to the aforementioned example.

In one embodiment of the invention, initialization of the above-mentioned classification learning model may entail assigning default values to a set of parameters and/or hyper-parameters associated with the machine learning schema from which the classification learning model is based. A parameter may refer to a configurable variable, pertinent to the machine learning schema, whose value is derived through data (e.g., the select-gapless dataset) in conjunction with one or more iterations of a learning process (i.e., a process through which the machine learning schema approximates the above-mentioned mapping function). A hyper-parameter, on the other hand, may refer to a configurable variable, pertinent to the machine learning schema, whose value is set before the learning process commences. Furthermore, the default values assigned to the set of parameters and/or hyper-parameters may be prescribed by administrators of the disk failure forecasting service.

In Step 204, incremental (or online) learning is applied to the classification learning model (initialized in Step 202) using the select-gapless dataset (obtained in Step 200). In one embodiment of the invention, incremental learning may refer to a learning process (described above) whereby only one training sample (e.g., one data tuple of the select-gapless dataset) may be stored and processed at a time sequentially, and whereby an initial model (e.g., the classification learning model) may be assumed and subsequently updated for future classifications (or predictions) at each step.

More specifically, in one embodiment of the invention, at each step of the incremental learning process: (i) the learning objective is to predict a corresponding label (or class) for a given input (i.e. the feature subset portion of one of the data tuples in the select-gapless dataset) using the initialized classification learning model (during a first step) or a previously updated classification learning model (during subsequent steps, which may be obtained at the end of a previous step), where a different data tuple is used at each step; (ii) identify the true label or class (i.e., the disk health class portion of the data tuple used in the current step) mapped to the given input; (iii) determine a loss or error between the aforementioned true label and the predicted label ascertained in (i); and (iv) update the set of parameters and/or hyper-parameters of the initialized or previously updated classification learning model based on the error determined in (iii), to obtain an updated classification learning model, which may be used in a next step of the incremental learning process.

In one embodiment of the invention, following a completion of the incremental learning process, one or more new data tuples without corresponding true labels (or classes) (i.e., testing sample(s)) may be processed using the last updated classification learning model obtained through the incremental learning process. As a result of the processing, a predicted label (or class) may be obtained for each new data tuple. Accordingly, for a given new data tuple, processed using the last updated classification learning model, a prediction directed to a disk health class mapped to the given new data tuple may be obtained. The predicted disk health class may reflect a future operating state (e.g., normal or failed) of a given physical storage disk associated with the given new data tuple. Furthermore, following the attainment of a set of disk health class predictions for a set of physical storage disks, respectively, a subset (if any) of the set of disk health class predictions—i.e., a subset forecasting disk failure—and, subsequently, a corresponding subset (if any) of the set of physical storage disks, may be identified and isolated.

In Step 206, a prediction reliability algorithm is applied to the disk failure forecasting subset of the set of disk health class predictions (also referred herein as the set of disk failure forecasts) (identified in Step 204). In one embodiment of the invention, a prediction reliability algorithm may refer to an assessment of machine learning based predictions with the objective of ascertaining a confidence and/or credibility associated with the predictions. Accordingly, the output of the prediction reliability algorithm, applied to a given prediction, may be a two-element data tuple reflecting a confidence value and/or a credibility value (also referred to as a confidence-credibility score) derived for the given prediction. Further, confidence may measure how likely a given prediction is correct, whereas credibility may measure how suitable the training samples (e.g., the select-gapless dataset) were for obtaining the given prediction. For either metric, a higher value may be indicative that the given prediction is more reliable. By way of an example, the applied prediction reliability algorithm may be an inductive conformal prediction (ICP) framework. Details outlining the implementation of the ICP framework are outside the scope of embodiments of the invention and, therefore, will not be covered herein.

In Step 208, the disk failure forecasting subset of the set of disk health class predictions (identified in Step 204) is ranked based on the confidence-credibility score (obtained for each disk failure forecasting prediction in Step 206). Specifically, in one embodiment of the invention, the disk failure forecasting predictions may be ranked in descending order from a highest confidence-credibility score to a lowest confidence-credibility score. The resulting disk failure forecasting subset, arranged in the aforementioned descending confidence-credibility score order, may be referred herein as a ranked set of disk failure forecasts.

In Step 210, the ranked set of disk failure forecasts (obtained in Step 208) is transmitted to the admin client (described above—see e.g., FIG. 1). More specifically, in one embodiment of the invention, a data object (e.g., list, table, file, etc.) may be provided to the admin client, where upon receipt of the data object, the contents therein may be displayed in a management dashboard (i.e., user interface) used by an administrator to oversee backup storage system operations, analytics, configurations, and other pertinent information. By way of an example, the contents of the aforementioned data object may include, but are not limited to, for each disk failure forecast arranged in rank-order exhibited by the ranked set of disk failure forecasts: (a) a physical storage disk identifier (e.g., serial number) associated with a given physical storage disk mapped to the disk failure forecast; (b) the confidence value from the confidence-credibility score derived for the disk failure forecast (obtained in Step 206); and (c) the credibility value from the confidence-credibility score derived for the disk failure forecast. Contents of the aforementioned data object is not limited to the aforementioned examples. In one embodiment of the invention, an administrator, given the above-mentioned contents (through a management dashboard) may subsequently procure replacement physical storage disks for at least some of the existing physical storage disks, on the backup storage system, with higher likelihoods to fail in the forthcoming forecast horizon.

In Step 212, a procurement order is issued. In one embodiment of the invention, the procurement order may be directed to a sales client (see e.g., FIG. 1), which may operate as a point-of-sale system for the procurement of products (i.e., physical or virtual components) and/or services geared for the maintenance and/or upgrade of the backup storage system. Further, the procurement order may represent an electronic request for the acquisition (e.g., purchase, delivery, and installation) of, for example, one or more physical storage devices, which may be used to replace one or more existing physical storage devices, on the backup storage system, mapped to any subset or all of the ranked set of disk failure forecasts (obtained in Step 208).

Figure 3:
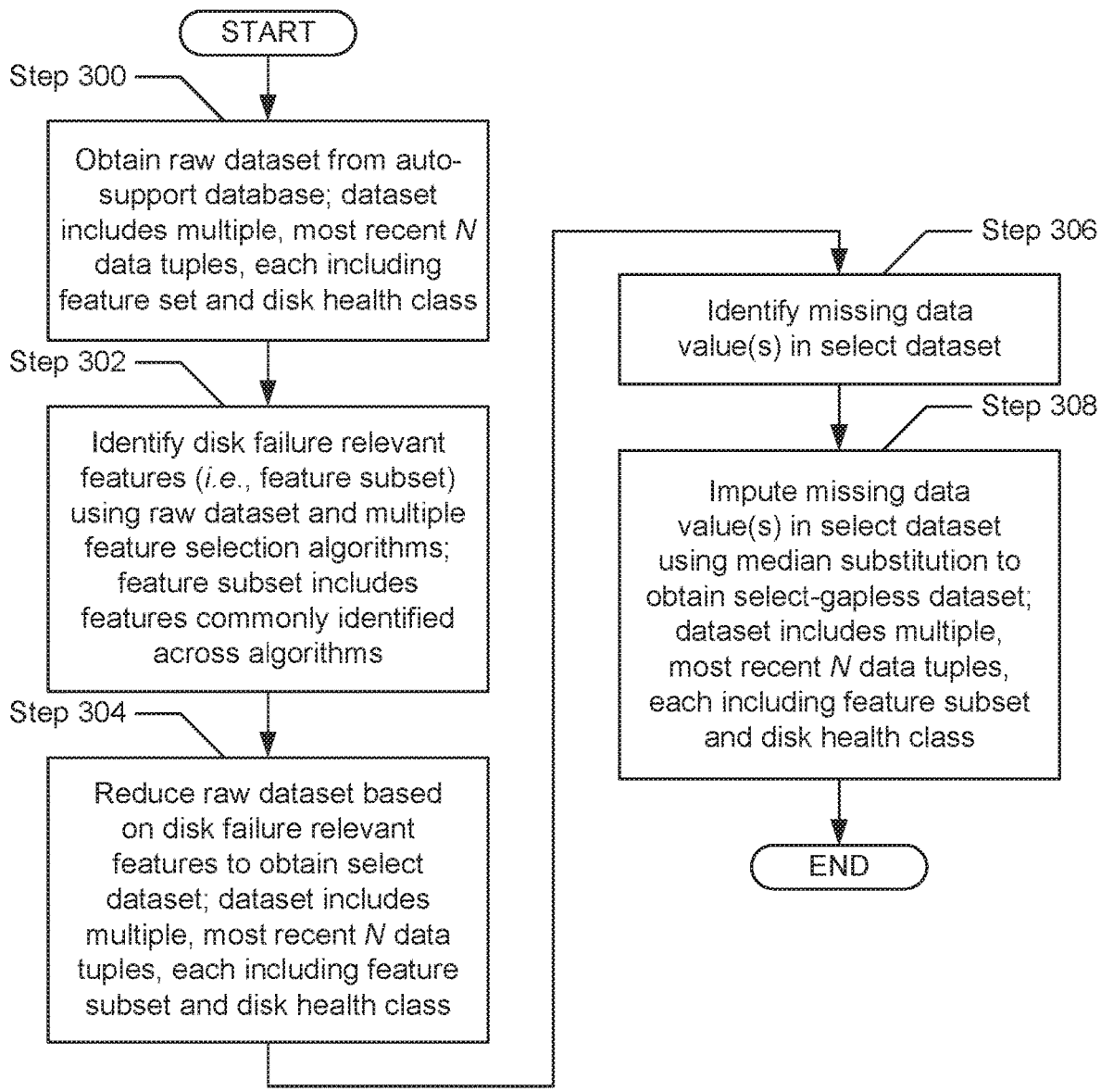
FIG. 3 shows a flowchart describing a method for obtaining select-gapless datasets in accordance with one or more embodiments of the invention.

FIG. 3 shows a flowchart describing a method for obtaining select-gapless datasets in accordance with one or more embodiments of the invention. The various steps outlined below may be performed by the disk failure forecasting service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a raw dataset is obtained from the auto-support database. As described above (see e.g., FIG. 1), in one embodiment of the invention, the auto-support database may store configuration, log, and performance information pertaining to the storage system. Further, the aforementioned information may include SMART data and SCSI error codes directed to storage disk reliability and operating state, respectively, for each physical storage disk on the storage system for varying given points in time. The raw dataset, accordingly, may encompass multiple data tuples representative of at least a portion of the aforementioned SMART data and SCSI error codes.

More specifically, in one embodiment of the invention, each above-mentioned data tuple may map a feature set to a disk health class. A feature set may refer to a collection (e.g., array or vector) of values characterizing a given physical storage disk at a given point in time, where each value may be representative of a different feature or attribute captured in the SMART data. The disk health class, on the other hand, may refer to a single value reflective of the operating state (e.g., normal or failed) of the given physical storage disk at the given point in time, which may be derived from the SCSI error codes. Furthermore, the various data tuples may reflect SMART data and SCSI error codes for multiple, different physical storage disks installed on the storage system, which may have been collected across any given range of points in time.

In Step 302, a feature subset is identified. In one embodiment of the invention, the feature subset may represent a portion of the features or attributes, captured in the SMART data, which may contribute most to deducing the correct operating state (or disk health class) of any given physical storage disk. Further, identification of the feature subset may entail: (a) the separate application of multiple, known feature selection algorithms to the raw dataset (obtained in Step 300), to obtain a resulting list of significant features for each of the multiple, known feature selection algorithms; and (b) converging the multiple resulting lists of significant features into the feature subset, where the feature subset includes the features commonly identified across the aforementioned, multiple resulting lists. The multiple, known feature selection algorithms may include, but are not limited to, an extreme gradient boosting (XGB) feature selection algorithm, a light gradient boosting model (LGBM) feature selection algorithm, an extra tree feature selection algorithm, a decision tree feature selection algorithm, a gradient boost feature selection algorithm, an adaptive boosting (AdaBoost) feature selection algorithm, and a random forest feature selection algorithm.

In Step 304, a dimensionality of the raw dataset (obtained in Step 300) is reduced based on the feature subset (identified in Step 302), to obtain a select dataset. Subsequently, in one embodiment of the invention, the select dataset may assume a reduced form of the raw dataset, where the number of data tuples remains unchanged, however, the original collection of features (exhibited in the feature set portion of each data tuple) is reduced to include values representative of the portion of features identified in the feature subset. Each data tuple, in the select dataset, further retains the disk health class originally mapped to the feature set thereof.

In Step 306, missing feature subset values (if any), exhibited throughout the select dataset (obtained in Step 304), are identified. In one embodiment of the invention, a missing feature subset value may refer to a value, amongst the feature subset portion of a data tuple, that is not present for a feature of the feature subset. Further, a missing feature subset value may result from a variety of reasons such as, for example, the corruption of SMART data during transmission from the storage system to the auto-support database (or from the auto-support database to the disk failure forecasting service); and the malfunction (or incorrect calibration) of a physical or logical sensor responsible for producing the values respective to one or more given features.

In Step 308, the missing feature subset value(s) (if any) (identified in Step 306) is/are imputed. In one embodiment of the invention, imputation may refer to the replacement of missing data with substituted values through inference. Further, imputation of the missing feature subset value(s) may be implemented using one of several known techniques. By way of an example, the missing feature subset value(s) may be imputed through median substitution. In median substitution, the median value of a given feature (across all data tuples) may be used in place of the missing feature subset value(s) associated with the given feature. Imputation of the missing feature subset value(s) is not limited to the aforementioned example. Moreover, through the imputation of the missing feature subset value(s), a select-gapless dataset may be derived from the select dataset (obtained in Step 304). Accordingly, the select-gapless dataset assumes a completed (i.e., without missing values) from of the select dataset.

Figure 4:
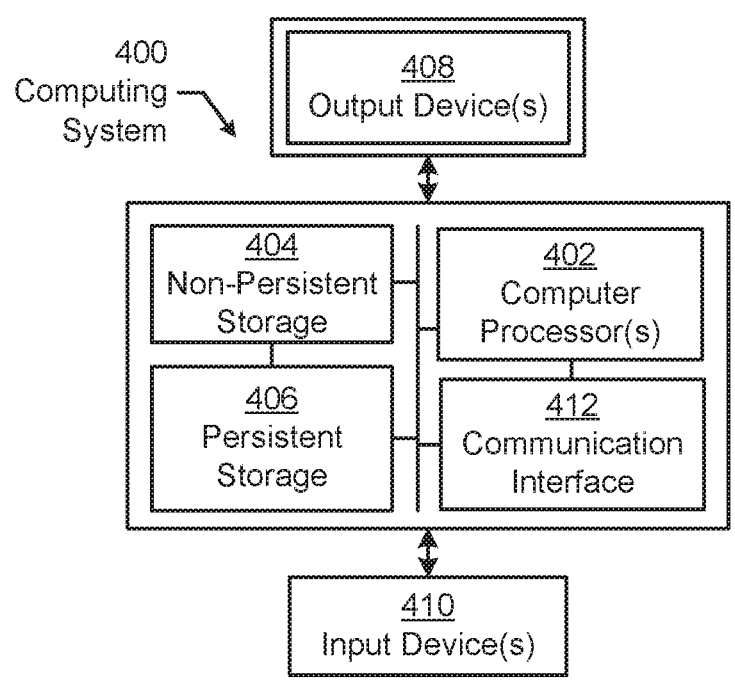
FIG. 4 shows a computing system in accordance with one or more embodiments of the invention.

FIG. 4 shows a computing system in accordance with one or more embodiments of the invention. The computing system (400) may include one or more computer processors (402), non-persistent storage (404) (e.g., volatile memory, such as random access memory (RAM), cache memory), persistent storage (406)(e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s)(402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forecasting storage disk failure, comprising:
    obtaining, from an auto-support database, a raw dataset comprising a first set of data tuples, each comprising a feature set and a disk health class, the data tuples include SMART data and SCSI error codes for a plurality of different physical storage disks that have been collected over a preset amount of time;
    reducing the raw dataset to a select dataset comprising a second set of data tuples, each comprising a feature subset of the feature set and the disk health class;
    inputting a set of missing data values in the select dataset to obtain the select-gapless dataset comprising a gapless version of the second set of data tuples;
    initializing a classification learning model;
    applying incremental learning to the classification learning model using the select-gapless dataset to obtain a set of disk failure forecasts for a set of storage disks; and
    performing a proactive response based on the set of disk failure forecasts, wherein the proactive response comprises replacing at least one disk from the set of storage disks.

2. The method of claim 1, further comprising:
    prior to reducing the raw dataset to the select dataset:
        identifying the feature subset of the feature set using a set of feature selection algorithms,
        wherein the feature subset comprises features commonly selected by the set of feature selection algorithms,
        wherein the raw dataset is reduced based on the feature subset.

3. The method of claim 2, wherein the set of feature selection algorithms comprises an extreme gradient boosting (XGB) algorithm, a light gradient boosting model (LGBM) algorithm, an extra tree algorithm, a decision tree algorithm, a gradient boost algorithm, an adaptive boosting (AdaBoost) algorithm, and a random forest algorithm.

4. The method of claim 1, wherein the set of missing data values is imputed using median substitution.

5. The method of claim 1, wherein the classification learning model is a stochastic gradient descent classifier.

6. The method of claim 1, wherein the proactive response further comprises alerting a storage system administrator.

7. The method of claim 1, further comprising:
    prior to performing the proactive response:
        applying a prediction reliability algorithm to the set of disk failure forecasts to obtain a set of confidence-credibility scores; and
        ranking the set of disk failure forecasts based on the set of confidence-credibility scores to obtain a ranked set of disk failure forecasts,
        wherein the proactive response is performed further based on the ranked set of disk failure forecasts.

8. The method of claim 7, wherein the prediction reliability algorithm is an inductive conformal prediction (ICP) framework.

9. A system, comprising:
an auto-support database operatively connected to a disk failure forecasting service,
the disk failure forecasting service comprising a computer processor configured to:
obtain, from an auto-support database, a raw dataset comprising a first set of data tuples, each comprising a feature set and a disk health class, the data tuples include SMART data and SCSI error codes for a plurality of different physical storage disks that have been collected over a preset amount of time;
reduce the raw dataset to a select dataset comprising a second set of data tuples, each comprising a feature subset of the feature set and the disk health class;
input a set of missing data values in the select dataset to obtain the select-gapless dataset comprising a gapless version of the second set of data tuples;
initialize a classification learning model;
apply incremental learning to the classification learning model using the select-gapless dataset to obtain a set of disk failure forecasts for a set of storage disks; and
perform a proactive response based on the set of disk failure forecasts, wherein the proactive response comprises replacing at least one disk from the set of storage disks.

10. The system of claim 9, further comprising:
a storage system operatively connected to the auto-support database, and comprising a plurality of storage disks,
wherein the raw dataset comprises historical configuration and performance information for the plurality of storage disks.

11. The system of claim 9, further comprising:
the sales client, wherein the sales client is operatively connected to the disk failure forecasting service.

12. The system of claim 9, further comprising:
an admin client operatively connected to the disk failure forecasting service,
wherein the proactive response comprises issuing an alert to the admin client.

13. A non-transitory computer readable medium (CRM) comprising computer readable program code, which when executed by a computer processor, enables the computer processor to:
obtain, from an auto-support database, a raw dataset comprising a first set of data tuples, each comprising a feature set and a disk health class, the data tuples include SMART data and SCSI error codes for a plurality of different physical storage disks that have been collected over a preset amount of time;
reduce the raw dataset to a select dataset comprising a second set of data tuples, each comprising a feature subset of the feature set and the disk health class;
input a set of missing data values in the select dataset to obtain the select-gapless dataset comprising a gapless version of the second set of data tuples;
initialize a classification learning model;
apply incremental learning to the classification learning model using the select-gapless dataset to obtain a set of disk failure forecasts for a set of storage disks; and
perform a proactive response based on the set of disk failure forecasts, wherein the proactive response comprises replacing at least one disk from the set of storage disks.

14. The non-transitory CRM of claim 13, further comprising computer readable program code, which when executed by the computer processor, enables the computer processor to reduce the raw dataset to the select dataset, by:
identifying the feature subset of the feature set using a set of feature selection algorithms; and
reducing the raw dataset based on the feature subset,
wherein the feature subset comprises features commonly selected by the set of feature selection algorithms.

15. The non-transitory CRM of claim 13, wherein the classification learning model is a stochastic gradient descent classifier.

16. The non-transitory CRM of claim 13, further comprising computer readable program code, which when executed by the computer processor, enables the computer processor, prior to performing the proactive response, to:
apply a prediction reliability algorithm to the set of disk failure forecasts to obtain a set of confidence-credibility scores; and
rank the set of disk failure forecasts based on the set of confidence-credibility scores to obtain a ranked set of disk failure forecasts,
wherein the proactive response is performed further based on the ranked set of disk failure forecasts.

* * * * *